United States Patent [19]
Lehman

[11] Patent Number: 5,996,974
[45] Date of Patent: Dec. 7, 1999

[54] DEVICE FOR MATERIAL AND HEAT EXCHANGE

[75] Inventor: Jean-Yves Lehman, Maisons-Alfort, France

[73] Assignee: l'Air Liquide, Societe Anonyme pour l'Etude et l'Exploitation des Procedes Georges, Paris Cedex, France

[21] Appl. No.: 08/880,716

[22] Filed: Jun. 23, 1997

[30] Foreign Application Priority Data

Nov. 28, 1996 [FR] France ................................. 96 14606
May 22, 1997 [FR] France ................................. 97 06257

[51] Int. Cl.$^6$ ................................................ B01F 3/04
[52] U.S. Cl. .................... 261/79.2; 261/94; 261/DIG. 72
[58] Field of Search .................... 261/79.2, 94, DIG. 72

[56] References Cited

U.S. PATENT DOCUMENTS

| | | | |
|---|---|---|---|
| 4,497,751 | 2/1985 | Pluss | 261/94 |
| 4,830,792 | 5/1989 | Wilhelm | 261/79.2 |
| 5,063,000 | 11/1991 | Mix | 261/DIG. 72 |
| 5,158,712 | 10/1992 | Wilhelm | 261/94 |
| 5,500,160 | 3/1996 | Suess | 261/94 |
| 5,629,258 | 5/1997 | Suess et al. | 261/DIG. 72 |

FOREIGN PATENT DOCUMENTS

| | | | |
|---|---|---|---|
| 1095827 | 2/1981 | Canada . | |
| 0 638 358 | 2/1995 | European Pat. Off. . | |
| 0 671 207 | 9/1995 | European Pat. Off. . | |
| 318889 | 2/1920 | Germany | 261/DIG. 72 |
| 1655557 A1 | 6/1991 | U.S.S.R. | 261/DIG. 72 |
| 1004046 | 9/1965 | United Kingdom . | |
| WO 86/06296 | 11/1986 | WIPO | 261/DIG. 72 |
| WO 90/10497 | 9/1990 | WIPO | 261/DIG. 72 |

*Primary Examiner*—C. Scott Bushey
*Attorney, Agent, or Firm*—Young & Thompson

[57] ABSTRACT

Heat and material exchange device including a stack of fixed ventilators to promote gas mixing, each ventilator being constituted by four deflectors whose mean normals are inclined and generated one after another by rotation about vertical axes, the sum of the four angles of rotation being 360°. The ventilators are stacked in successive horizontal layers amidst which each deflector forms a part of two adjacent ventilators turned in opposite directions and such that there is sufficient space between two adjacent deflectors for the passage of gas. The deflectors are pierced by at least one hole so as to promote passage of the liquid to the underside of the deflectors. At least some of the deflectors are connected to at least one of their neighbors in a same horizontal plane by a common edge segment so as to permit lateral division of the liquid between deflectors. The device is useful in columns for separating the components of air, or mixtures of carbon monoxide, nitrogen, hydrogen or hydrocarbons, or for the separation of isotopes.

12 Claims, 11 Drawing Sheets

DEVICE FOR MATERIAL AND HEAT EXCHANGE

CROSS REFERENCE TO RELATED APPLICATIONS

This application corresponds to French applications 96 14606 of Nov. 28, 1996 and 97 06257 of May 22, 1997.

FIELD OF THE INVENTION

The present invention relates to a device for material and heat exchange and, in particular, a device for material and heat exchange adapted to serve as packing in distillation columns with a high number of theoretical plates, typically in columns for the distillation of air or mixtures of carbon monoxide, nitrogen, hydrogen or hydrocarbons, or in isotopic separation columns. It can also serve for isotopic distillation. Typically, it will be installed in distillation columns with a high number of theoretical plates.

BACKGROUND OF THE INVENTION

The packing ordinarily used comprises corrugated strips comprising alternate parallel corrugations each disposed in a general vertical plane and against each other, the undulations being oblique and descending in opposite directions from one strip to the next. The degree of perforation is about 10% for this so-called cross corrugated packing.

GB 1 004 046 discloses packings of the cross corrugation type.

CA-1 095 827 provides an improvement of this type of packing by adding dense perforations of small diameter to permit the liquid to move from one side to the other of the cross corrugated strips.

WO 94/12258 provides an improvement of this type of packing based on exact positioning of the strips relative to each other in a vertical plane, by a system of interlocking. This device has for its object to provide more packing surface in a same volume, because the interlocking permits an interpenetration of the strips.

WO 86/06296 and WO 90/10497 disclose a packing comprising horizontal superposed layers, each layer comprising rows of pyramids.

In WO 86/06296, the structure comprises pyramids with open bases, and lateral surfaces alternately open and closed, connected at their points so as to constitute a multitude of ventilator blades placing the gas in rotation to intensify the contact between the gas and the liquid. A fundamental characteristic of this structure is that it can be made by assembly of perforated and bent metal sheets. This time, the perforation is not only adapted to optimize the circulation of the liquid but also to permit the gas to pass through the bent crossing strips, the rate of perforation being of the order of 50%.

Paradoxically, it is just at this moment at the beginning of serious contestation of the cross corrugated packing that the latter began to be used in the separation of air gases. This relatively late use is explained in part by the high performances of cryogenic plates relative to other plates on the market (HETP, height equivalent to a theoretical plate, of the order of 10 cm, and low pressure drop).

In WO 90/10497, the structure obtained above is improved by causing the surfaces of the pyramids of two successive layers to coincide, which creates transverse channels relative to the strips, and promotes the transverse movement of the mixture. It mentions clearly the interest of a double perforation: one with a checkerboard pattern (hence with 50% of the surface perforated) for the gas, and a secondary perforation in the "closed surfaces" to promote the streaming of the liquid.

This latter patent application gave rise to the Sulzer product "Optiflow"™ which represents the first embodiment of a new generation, making possible substantially improved performance relative to the now-conventional cross corrugation structures (HETP reduced by an order of 25 to 30% with constant vapor flow rate, or flooding flow rate increased by the order of 25 to 30% with HETP constant).

This patent and these patent applications permit isolating two important directions of research. The first has for its object to improve the flow of the liquid so that the wetted surface will be as large as possible and so that the liquid will distribute itself in all directions whilst remixing in the course of trickling through the packing. The second has for its object to optimize the gas flow, which is to say to obtain a vertical flow as turbulent as possible, without favored flow paths nor regions of low circulation.

Until now, the flow of the liquid phase has been studied in structures of the cross corrugated type. It has been discovered that small diameter perforations (about 10%) promote the passage of the liquid on each side of the strips. Several improvements have been proposed: CA-A-1095827 claims a precise positioning of the holes relative to the bends and WO 94/12258 claims the relative positioning of the strips, by interpenetration of the strips. Thus it appears that the positioning of the holes does not substantially increase the efficiency of the packing because the principal function of the holes is to cause the liquid to pass from one side to the other of the strip. Only the amount of perforation and the diameter of the holes therefore influence efficiency.

The idea of pyramids introduced by WO 86/06296 and WO 90/10497 introduces a new type of perforations: perforations for the passage of gas (representing about 50% of the surface). These perforations permit reducing the pressure drop and creating ventilators favoring the mixing of the gas. These documents are silent as to liquid circulation.

Connecting the pyramids by their points ("summits" and "corners", there is designated by "corners" the points located on the base) has an important drawback: because of there being little material at these points, the mechanical strength of the assembly requires physically connecting these "points" by a mechanical process of the type of clipping, tying, welding or cutting which requires complicated and costly tools, and hence results in a fairly high price. It can also be noted that the number of these connections varies as the number of the pyramids, which is to say as the cube of the inverse of their size, which limits the specific surface economically accessible in this type of packing. On the other hand, the principle of perforating in a checkerboard pattern gives rise to a loss of material of the order of 50%; this is particularly undesirable when the material of the packing is of high cost, a woven material for example.

It also appears that this structure is very aerated and that the HETP could be further reduced if a portion of the waste material was integrated back into the structure without impairing the turbulence of the gas or the rate of wetting of the surface.

SUMMARY OF THE INVENTION

The object of the present invention is to create a device for heat and material exchange having good properties as to gas flow, including a series of improvements relating to the spreading, distribution and mixing of the liquid and of simplified manufacture relative to those of the prior art and hence permitting the practical realization of very thin packing, hence with an even smaller HETP.

According to an object of the invention, there is provided a heat and/or material exchange device constituted by a stack of fixed ventilators, so as to promote gaseous mixture, each ventilator being constituted by four deflectors whose mean normals are inclined and substantially generated one from the others by rotation about vertical axes, the sum of the four angles of rotation being 360° and the ventilators being stacked in successive horizontal layers within which each deflector forms a portion of two adjacent ventilators turning in opposite directions and such that there is sufficient space between two adjacent deflectors for the passage of gas.

The deflectors of the ventilators can be flat or not, symmetrical or not, generated by rotation about a vertical axis or not.

The structure thus described permits creating turbulent flow of the gas which improves exchange between the liquid film streaming over the deflectors and the gas. It has the advantage of giving great freedom of design to define the shape and connections of the deflectors. This freedom can be used to improve the other functions of the product and to reduce its cost.

It should be noted that the open pyramidal structure of the patent applications WO 86/06296 and WO 90/10497 is a very particular case of the general structure which has been described when the following conditions are simultaneously satisfied:

1. the deflectors of the ventilators are rhombi whose one diagonal is horizontal or triangles whose base is horizontal.
2. the angles of rotation of the deflectors are 90°.
3. the axes of rotation pass through the ends of the horizontal diagonals of the deflectors of rhombus shape or through the ends of the horizontal bases of the deflectors of triangular shape.
4. the upper summits of the rhombi or of the triangles of one layer coincide with a summit of a rhombus or a triangle of the immediately superjacent layer.

According to another aspect of the invention
the deflectors of the ventilators are neither rhombi of which one diagonal is horizontal, nor triangles of which the base is horizontal or
the angles of rotation of the deflectors are not 90° or
the axes of rotation do not pass through the ends of the horizontal diagonals of the deflectors of rhombus shape or
the axes of rotation do not pass through the ends of the horizontal bases of the deflectors of triangular shape or
the upper summits of the rhombi or of the triangles of one layer do not correspond with a summit of a rhombus or of a triangle of the immediately superjacent layer.

According to another aspect of the invention, there is provided a device in which:

the lower portion of certain ones or all of the deflectors is bisymmetric.
the upper portion of certain ones or all of the deflectors is symmetrical relative to the line of greatest slope, and substantially of inverted V shape, so as to promote spreading of the liquid.
certain ones or all of the deflectors are pierced by one or several holes, with or without symmetry about the vertical axis, so as to promote the passage of liquid below the deflectors.
certain ones or all of the deflectors are connected to several of their neighbors in a same horizontal plane by a common edge segment, rounded, flattened or stamped, so as to permit lateral distribution of the liquid between deflectors.
certain ones or all of the deflectors penetrate the space located in vertical alignment with an adjacent deflector.
certain ones or all of the deflectors are designed to supply liquid to another deflector, generally with the aid of a point, or to collect the liquid from another deflector.
the lower portion of certain ones or all of the deflectors is at least partly enlarged, so as to preserve for the liquid a streaming surface as large as possible.
at least one end of the two deflectors forms a projection.
one or each projection nests with another projection or a notch so as to secure together the layers of ventilators.

It should also be noted that the application WO 94/12258 describes a structure in which each point of interpenetration is the center of four deflectors which are not generated by rotation. However, the deflectors are secured together such that there is no longer a passage for gas between two deflectors of vertically superposed ventilators. The concept of ventilators as such disappears because of the absence of perforations for gas.

In the device proposed here, the positioning of the strips relative to each other is motivated by the gas perforations which must be positioned precisely relative to each other.

According to another object of the invention, there is provided a process for the production of a device, in which flat sheets of metal or of another material are cut out and folded and/or bent, twisted or stamped to form accordion sheets, with or without projections, the plain surfaces forming flat, bent, curved or twisted deflectors.

The flat product used could be laminated, woven or knitted.

According to other aspects of the invention, there is provided a process for production in which:

the accordion sheets are placed side by side, parallel to a vertical plane.
the accordion sheets are pierced at least 45% before folding.
the structure is constituted by substantially identical accordion sheets in which the accordion sheets of uneven rows are reversed relative to the sheets of even rows about a vertical or horizontal axis included in the mean plane of the accordion sheet.
the positioning of the accordion sheets is ensured by a contact region permitting nesting the sheets and also permitting ensuring the stability of the accordion sheets, once locked against each other. The nesting can be designed so as to block the two degrees of freedom of translation at certain or all of the contact points. Moreover, it can be designed so as to block one degree of freedom in translation at certain contact points and the other degree of freedom at other contact points.
the accordion sheets are pierced and folded so as to connect the plain surfaces by two bend lines, curved or not, permitting liquid exchange between adjacent deflectors.
the bend lines are not continuous so as to create projections beyond the region comprised between two planes containing the bends.
the contact region is formed by a local stamping.
the contact region is formed by cutting out and folding and/or bending or twisting.

the projections permit positioning accordion sheets by nesting projections and/or notches.

the projections permit creating distributors or collectors for the deflectors of an adjacent layer.

the piercing proportion of the accordion sheets permits creating wide streaming surfaces.

According to an object of the invention, there is provided a process for the separation of air gases or hydrocarbons, or carbon dioxide, or isotopes, in a distillation column comprising at least one device as described.

According to another object of the invention, there is provided an installation for the separation of air gases or hydrocarbons, or carbon dioxide, or isotopes, in a distillation column comprising at least one device as described.

BRIEF DESCRIPTION OF THE DRAWINGS

Other aspects of the invention will now be described, with reference to the following drawings, in which:

FIG. 5A shows a perspective view and FIG. 5B a view along the axis of the folds of one of the sheets.

FIG. 8A shows four blades which take part in a contact zone, FIG. 8C shows a plan view of FIG. 8A and FIG. 8B shows two superposed ventilators created by the structure.

DETAILED DESCRIPTION OF THE INVENTION

Figure 1:
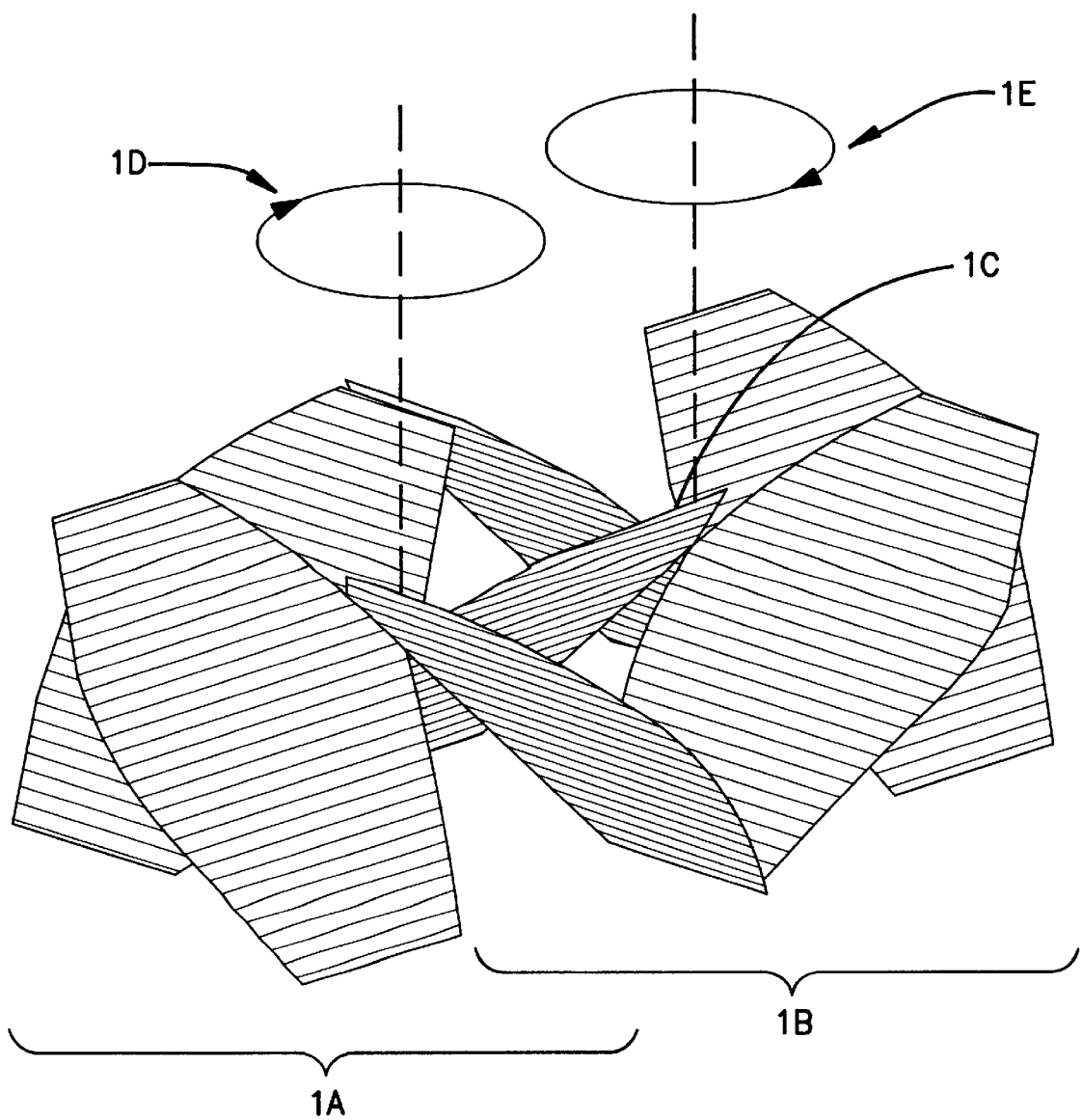
FIG. 1 is a perspective view of two ventilators of alternate directions of a device according to the invention.

FIG. 1 shows two fixed adjacent ventilators (1A and 1B) in a horizontal layer. The deflectors are not necessarily generated by rotation. These two ventilators direct the gas flow in opposite directions (vortex 1D and 1E), thereby creating a maximum of turbulence. It should be noted that the deflector 1C is common to the two ventilators. The complete structure is obtained by repeating this motif in three directions, with or without modifications of the geometry of the deflectors. The above cited documents are silent as to the circulation of the liquid in the structure.

Figure 2:
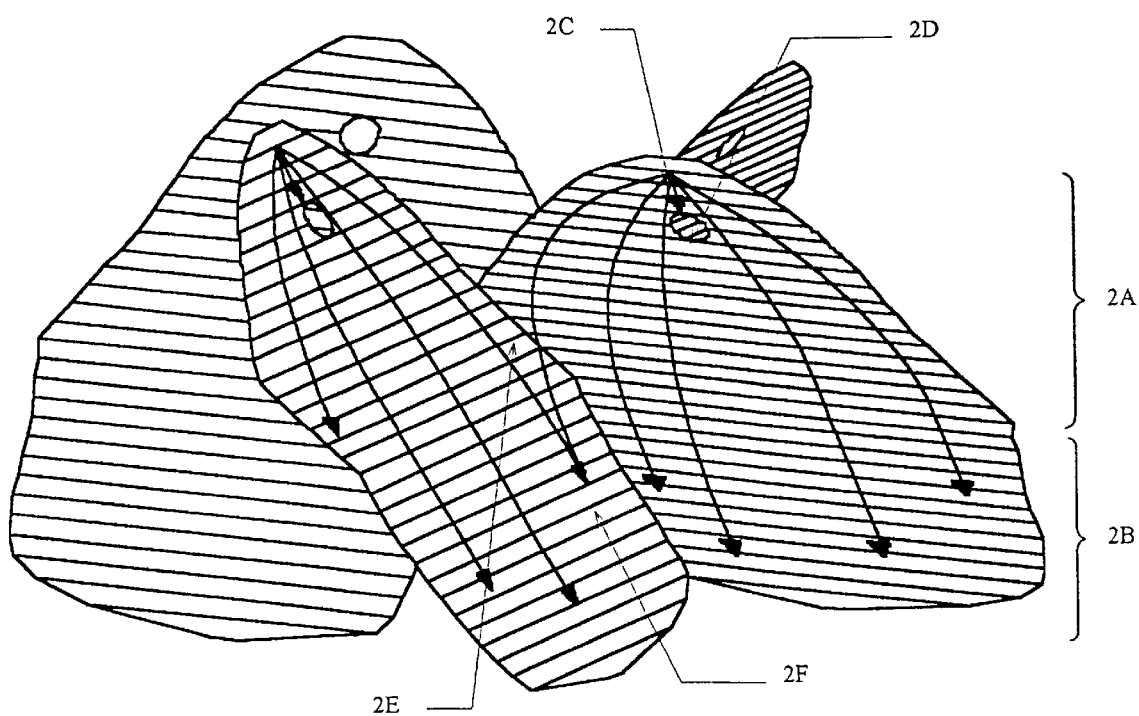
FIG. 2 shows the flow of liquid over the deflectors of a device according to the invention.

FIG. 2 shows the spreading of the liquid on the deflectors. It will be seen later the manner of interconnecting the deflectors between two horizontal layers. Let it be supposed only that each deflector is supplied at its summit (2C) by the streaming liquid. It is of course necessary that the maximum surface of the deflectors be wetted. This concern suffices to indicate the best form to be given to the deflectors.

The upper portion (2A) must be "pointed" so as to follow the spreading of the liquid from its supply point. On the other hand, once this spreading is obtained, the deflector can keep its maximum width for a certain distance to increase the streaming surface (2B). Thus, the collection is easier and can take place on edges of low slope with a slightly inclined contour. This leads to a "potbellied" shape.

The optimum distribution of liquid from the two sides of the deflectors leads to piercing a hole (2D) near the summit (2C) permitting a portion of the liquid to pass to the other side.

So that there is no preferred route for the liquid, a same stream of liquid should be distributed in several directions and continuously remixed. Thus, an edge segment (2E) common to two deflectors divides the liquid flowing over the deflector in two and creates a mixing region (2F).

For cost reasons, it is necessary that the deflectors be made from sheet material. Unfortunately, the perforation-folding and/or perforation-bending technique used until now to produce structured packings does not permit obtaining suitable shapes for the needs of the structure described above.

There exists however a method which permits obtaining very varied shapes from a flat product: cutting out folding. It suffices, to establish this point, to consider certain "pop-ups" or certain cardboard packages. The folding is well known to produce polyhedra. This process has never, to our knowledge, been used to produce structured packings. There could also be used a stamping technique, so as to obtain non-developable surfaces. Although very rich in possibilities, this process could be particularly economical because the successive operations of cutting out, folding and even stamping can be integrated in a same press tool.

Figure 3:
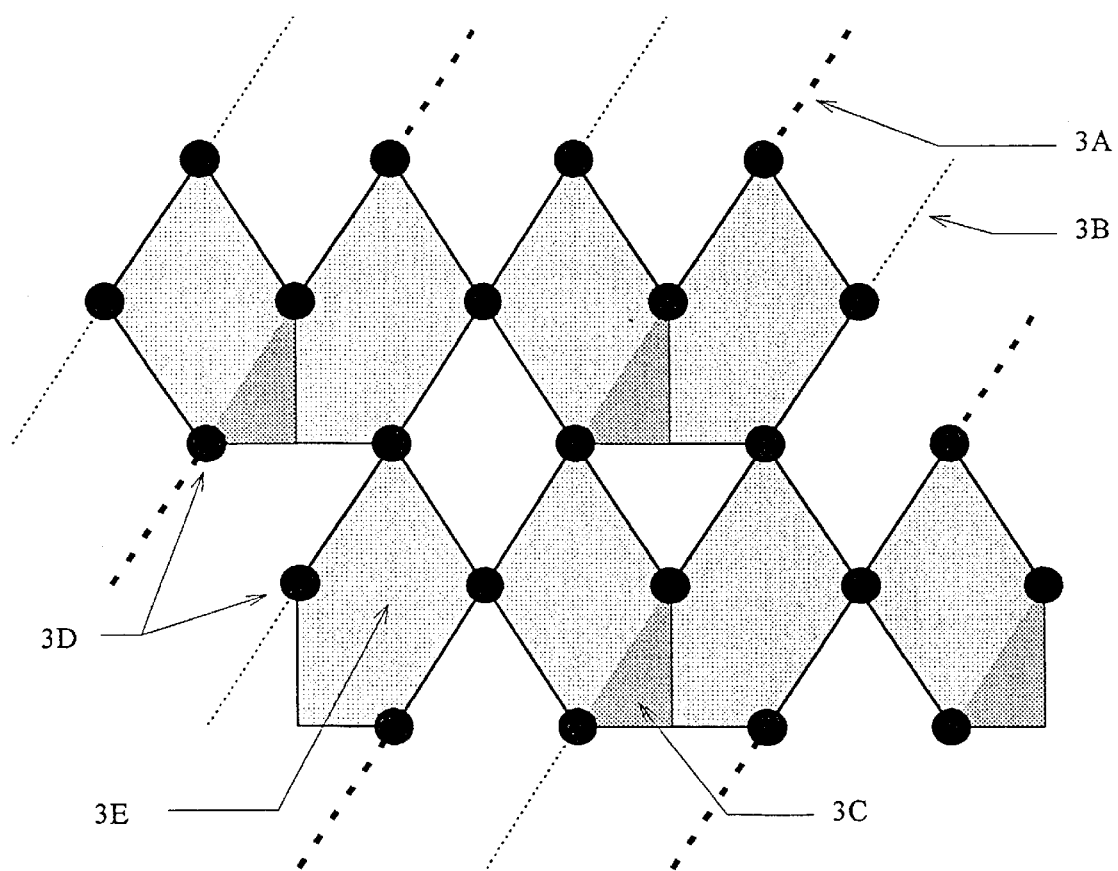
FIG. 3 is a schematic view of the cutting out of a metallic sheet according to the invention.

FIG. 3 shows the schematic cutting out of a sheet before folding, in which the deflectors are "plain" quadrilaterals (3E). The sheet thus cut out is then accordion folded according to the dotted lines. The thick dotted lines (3A) are "valley" folds, whilst the slender pointed lines (3B) show the "crest" folds. It should be noted that these fold lines are discontinuous because the gray portions (3C) are not folded with the rest and therefore form, after folding, projections beyond the two planes containing the crest and valley folds. Thus, the folding takes place only in regions symbolized by black dots (3D), which form both a connection between the deflectors and a contact point and/or interlocking points serving for the stacking and positioning during stacking of the accordion sheets. It will be seen later by what devices these regions can be made.

Figure 4:
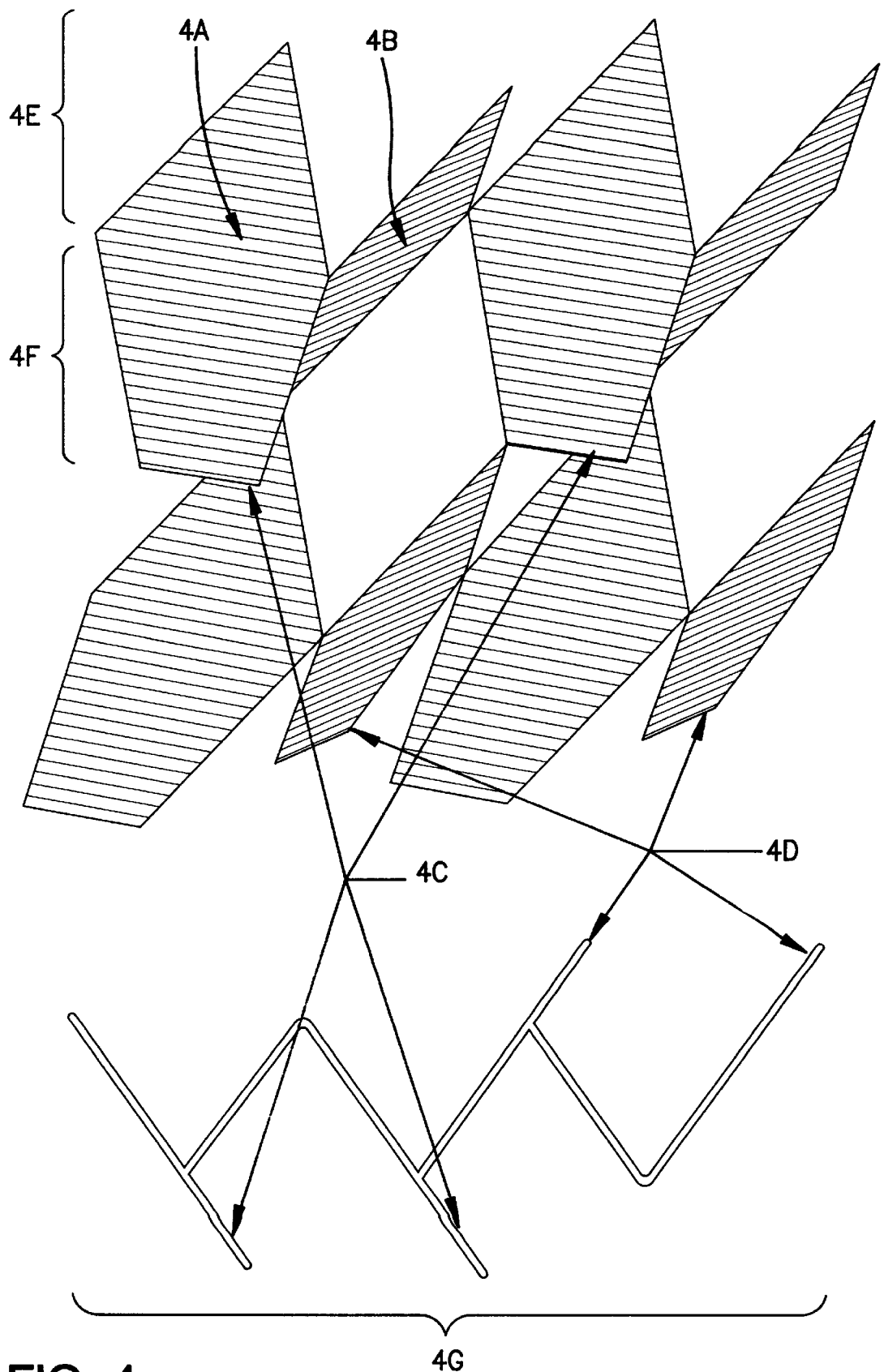
FIG. 4 shows two schematic representations of the metallic sheet of FIG. 3 accordion folded including a perspective view and a view along the axis of the folds.

FIG. 4 shows two schematic representations of a sheet of FIG. 3 accordion folded including a perspective view of the folded sheet and a view from above the sheet along the axis of the folds, on which can be clearly seen the accordion formed by the sheet (4G). The fold creates two planar orientations, characterized by two different grays of the deflectors (4A and 4B). Notice the projections (4C and 4D) which extend beyond the region comprised between the two planes containing the fold lines. It will therefore be seen that the deflectors, once folded, offer to the liquid a spreading surface (4E) which is "pointed" and symmetrical relative to the line of greatest slope, then an enlarged streaming surface (4F).

Figure 5A:
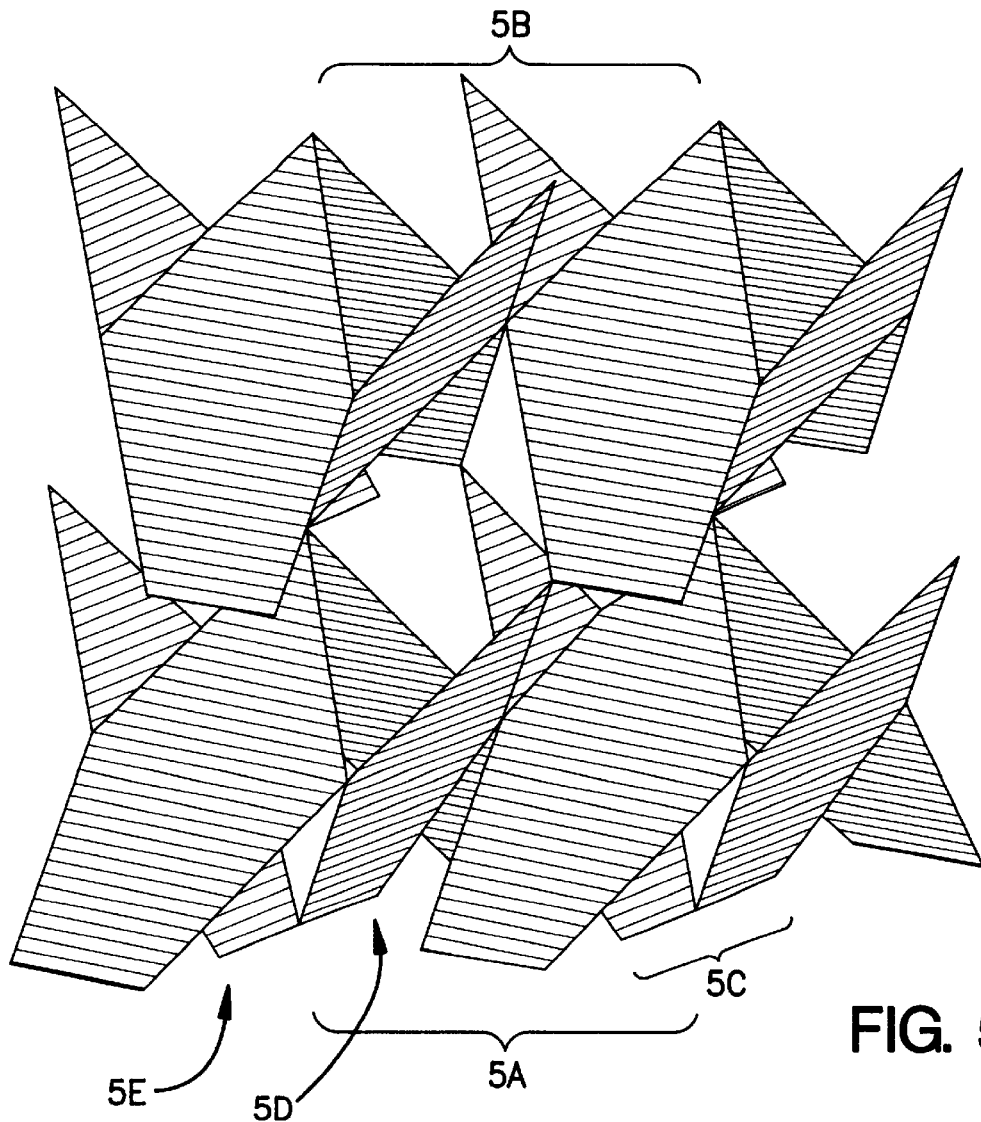
FIGS. 5A and 5B show two schematic representations of two metallic sheets of FIG. 4 assembled.
Figure 5B:
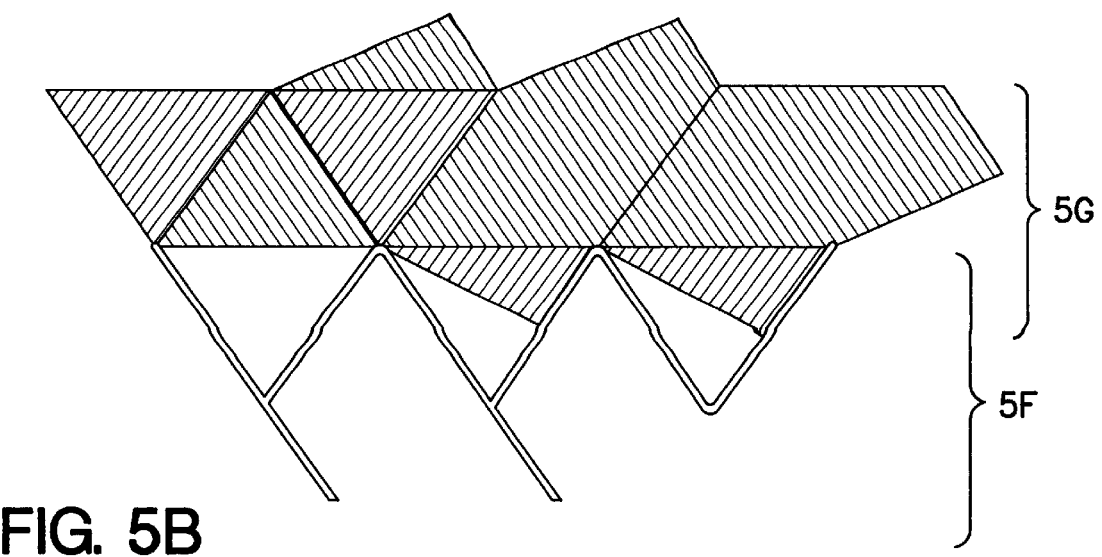

FIGS. 5A and 5B show two schematic representations of the structure obtained by assembly of the two folded strips according to FIG. 4. FIG. 5A is a perspective view of the structure. FIG. 5B is a plan view, along the axis of the folds of the sheet of the front plane, on which are seen the two stacked strips 5F and 5G. There will be seen in the foreground of FIG. 5A and at 5F the accordion sheet of FIG. 4. In the background of FIG. 5A and at 5G there is an identical sheet turned 180° relative to a vertical axis. Two superposed ventilators are created by this structure (5A and 5B). It will be noted that these ventilators are of two different types: 5A is a "closed" ventilator relative to the center of rotation; which is to say that the enlargement of the streaming surface is disposed to the side of the center of rotation, thereby offering a narrower passage to the gas. Conversely, 5B is an "open" ventilator. On a same vertical, there are alternately two types of ventilator. To obtain ventilators turned in the opposite direction, it would be necessary to add a supplemental accordion sheet. The structure obtained at 5C indicates why the bottom of the deflectors has no symmetrical streaming surface. Thus, if the base of the deflectors were symmetrical rectangular, it would have, of course, a larger streaming surface but there would be obtained at 5C a junction of the edges of the two deflectors forming a sort of horizontal gutter. Such a structure would be very undesirable, both for gas flow and for liquid flow. Finally, it should be noted that the projections of the accordion sheet of the first plane (5D), are insertable exactly between two successive folds of the sheet of the second plane. Similarly, the projections of the sheet in the background (5E) interfit between the folds of the sheet of the first plane. The relative position of the sheets to each other is thus ensured in all directions and a simple locking ensures the stability of the structure.

All the preceding figures, which are deliberately schematic, have for their object to demonstrate the characteristic principles of the structure. It is quite evident that the structure of FIG. 5A has no mechanical strength because it does not provide material at the points of connection between the deflectors. The cutout-folding principle, associated if desired with a stamping, permits obtaining a very great variety of shapes from which it is necessary to select to improve the structure, both as to its performance and as to simplicity of manufacture. The figures which follow describe an appropriate industrial structure, having high mechanical strength and including several improvements, relative to liquid flow and to manufacture.

Figure 6:
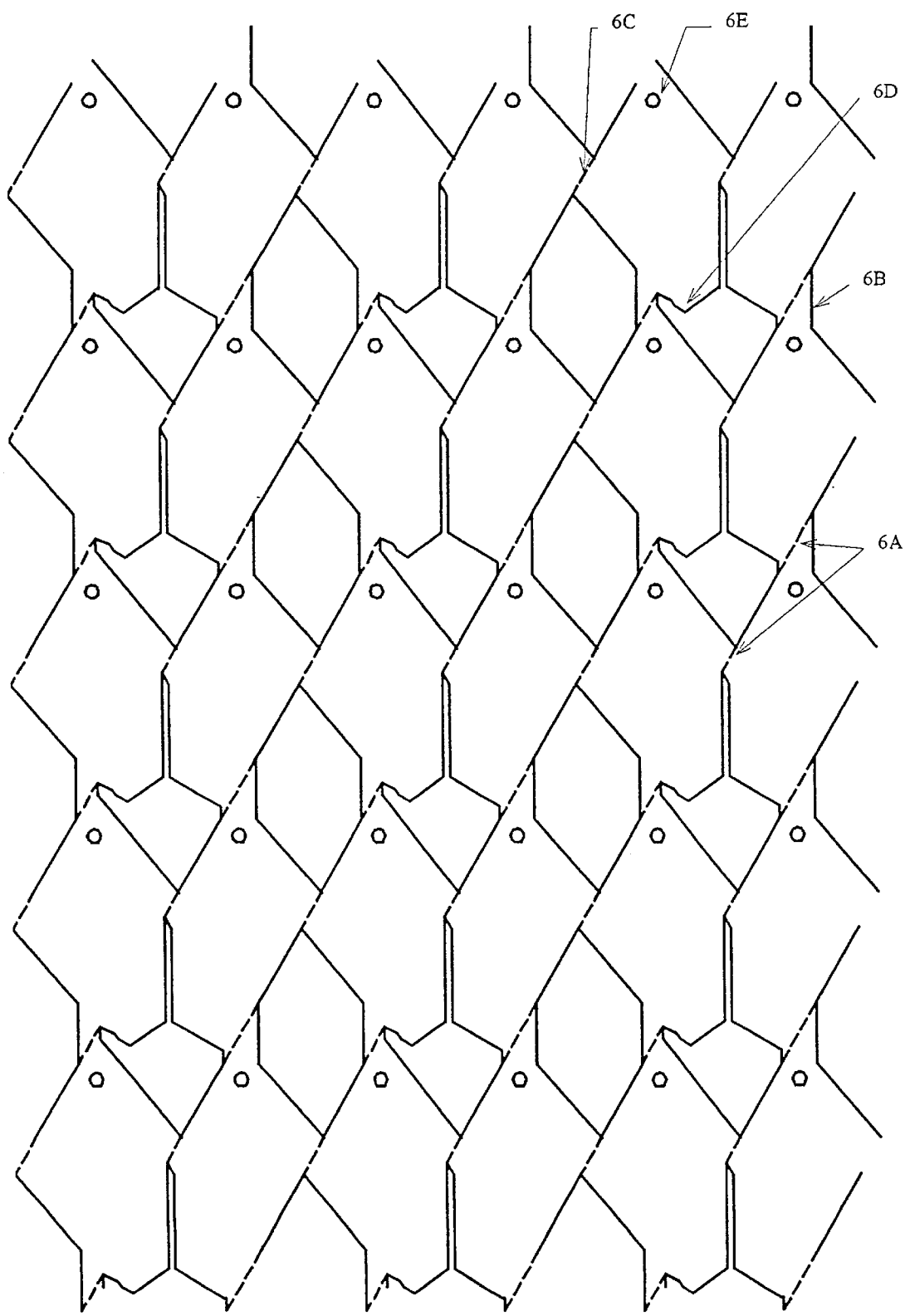
FIG. 6 shows the industrial cutting out of a metallic sheet according to the invention.

FIG. 6 shows the cutting out of an unfolded sheet. The fold lines (6A) are shown in phantom line; it will be seen that they are discontinuous. So as to obtain good mechanical strength, there remains at the connection points ⅓ of the material which would be folded if there were no cutting out. So as to preserve a structure as close as possible to ideal, this material has been distributed unequally over the different connection points. At 6B, to add a vertical edge is a good solution to obtain great length of fold while losing a minimum of open surface. On the other hand, it is necessary to avoid introducing a horizontal edge on which the liquid can accumulate, there is accordingly provided a fold line which constitutes an edge segment (6C) permitting the lateral distribution of the liquid. The projection at 6D serves both for the distribution of the liquid and to secure the strips to each other. Finally, there can be pierced in each deflector a hole (6E) which permits the passage of the liquid from one side to the other of the sheet.

Figure 7:
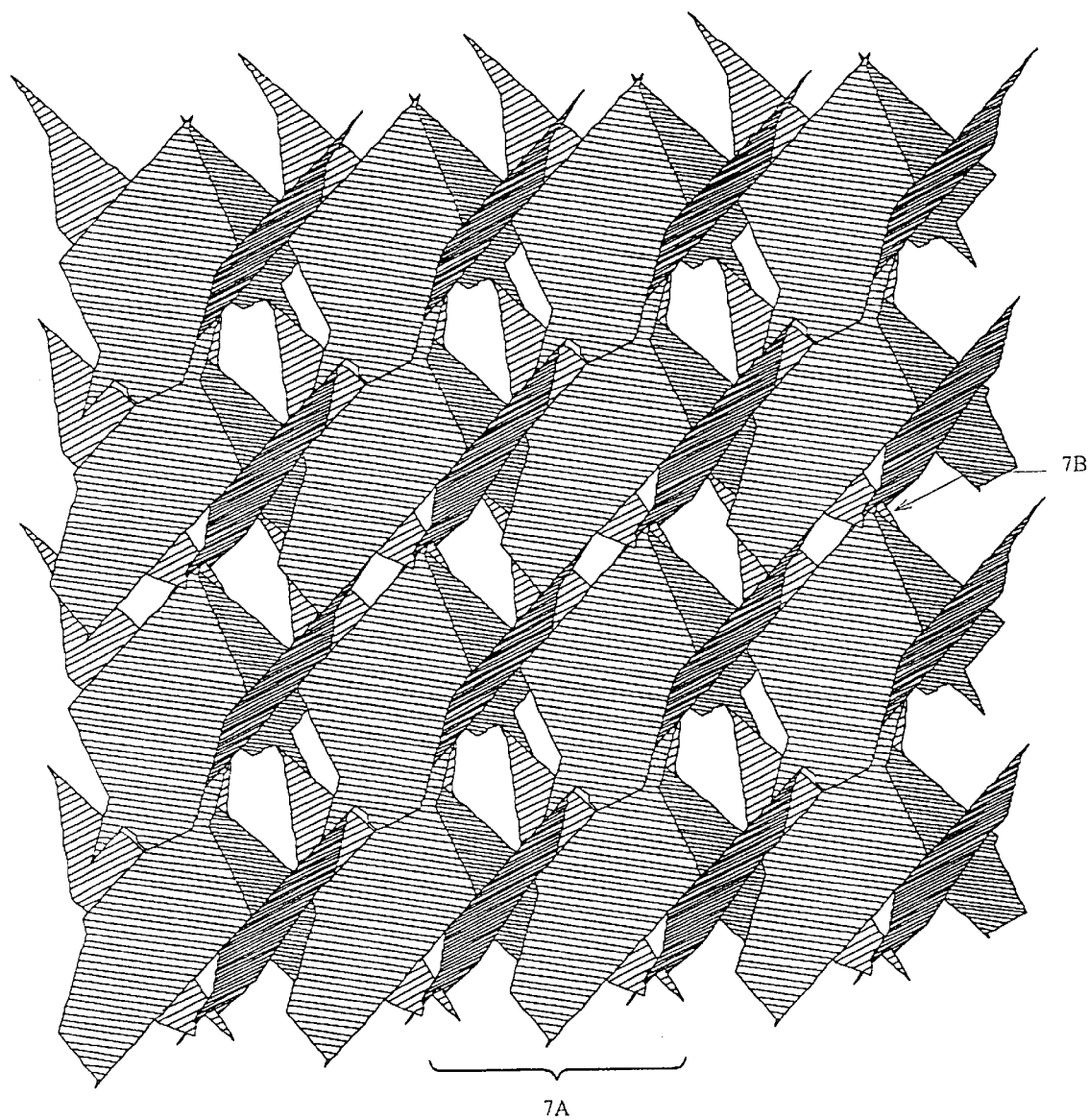
FIG. 7 shows the structure obtained by assembling two cutout and folded sheets according to FIG. 6.

FIG. 7 shows two sheets of FIG. 6 folded and assembled. Notice the series of stacked ventilators (7A). It was seen in FIG. 5 that the strips were positioned perfectly by the projections. The fold lines introduce relative to this position an imprecision equal to the length of the fold line. To compensate that, one can at the time of folding carry out a local stamping along the fold line such that the deepest point will be centered on the contact point. Thus, at the time of assembly, the structure is maintained in position by simple gripping of the strips against each other. In 7B, there is seen a contact point in which the projection of the strip in the background is provided with a point constituting both a sort of attachment securing together the strips and a liquid distributor for remixing.

Figure 8A:
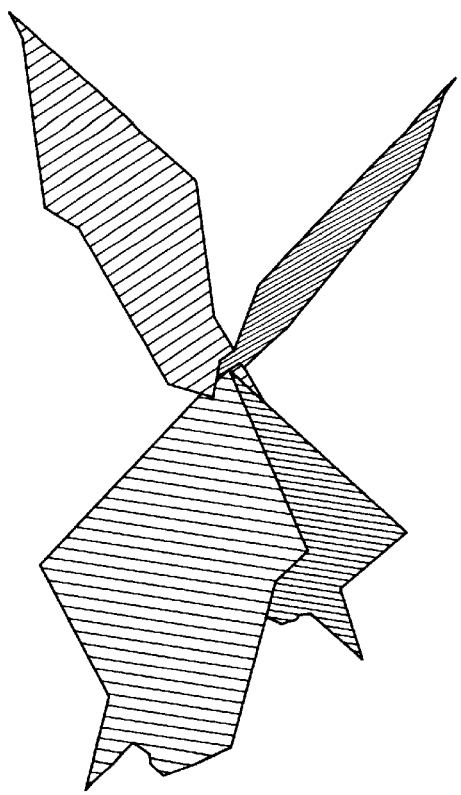
FIGS. 8A, 8B, and 8C show several details of the structure of FIG. 7.
Figure 8B:
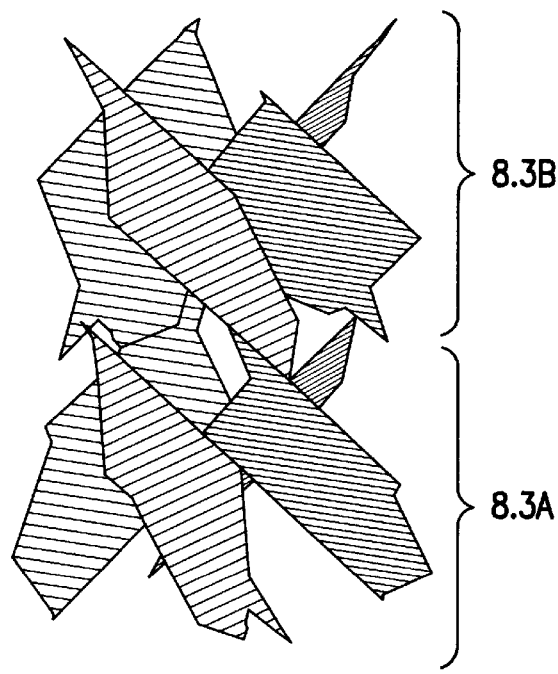
Figure 8C:
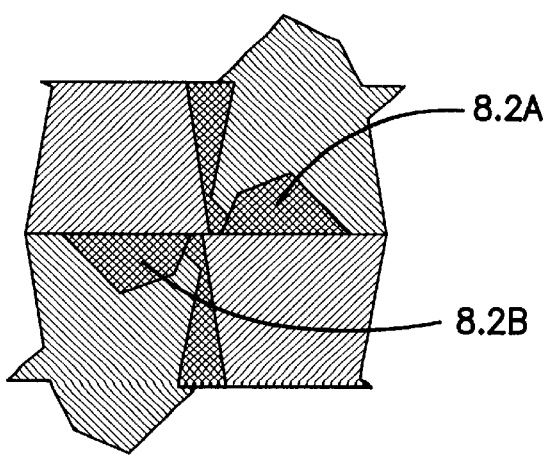

FIGS. 8A, 8B, and 8C show several enlargements of FIG. 7. FIG. 8A shows an enlargement of the contact region 7B. FIG. 8C shows a view from above of FIG. 8A without hidden surfaces on which it will be seen that the deflectors penetrate the space located in vertical alignment with the adjacent deflectors so as to create a wide streaming surface (8.2A) and a liquid supply for another deflector (8.2B) FIG. 8B shows two types of superposed ventilators, created by the structure: an "open" ventilator (8.3A) and a "closed" ventilator (8.3B).

Figure 9:
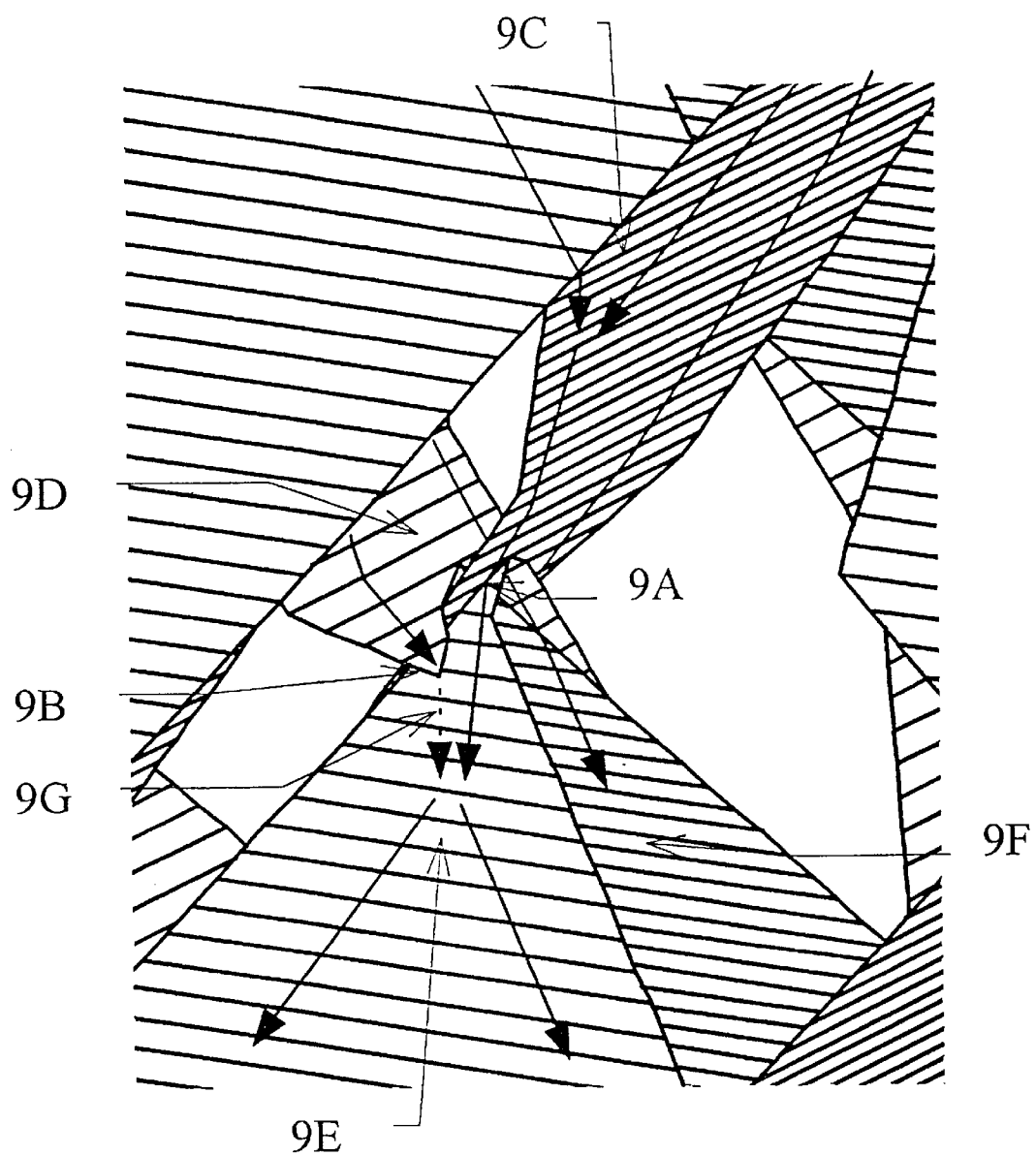
FIG. 9 shows an enlargement of the region 7B of FIG. 7 in which is shown the flow of the liquid.

FIG. 9 shows a detail of FIG. 7, located about 7B. The deflectors 9D and 9F belong to the accordion sheet of the second plane whilst 9C and 9E belong to the sheet of the first plane. The black arrows indicate the liquid flow over the deflectors. The structure is symmetrical relative to the contact point (9A). There is seen the manner in which the point (9B) and its symmetrical point form attachments which stabilize the structure. When the two accordion sheets are arranged face to face, the structure deforms a bit and returns to place when the point has taken its final position. In 9C, there is a lateral parting region of the liquid and then remixing. The liquid which flows over the deflector in the rear separates into two portions (9D). One portion, after passage through free fall (9G), will wet the deflector of the first plane (9E) by means of the distributor formed by the pointed projection (9B) and therefore mixes with the liquid flowing over the adjacent accordion sheet. The other portion of the liquid remains on the same accordion sheet and will wet the underside of the deflector 9F.

Figure 10A:
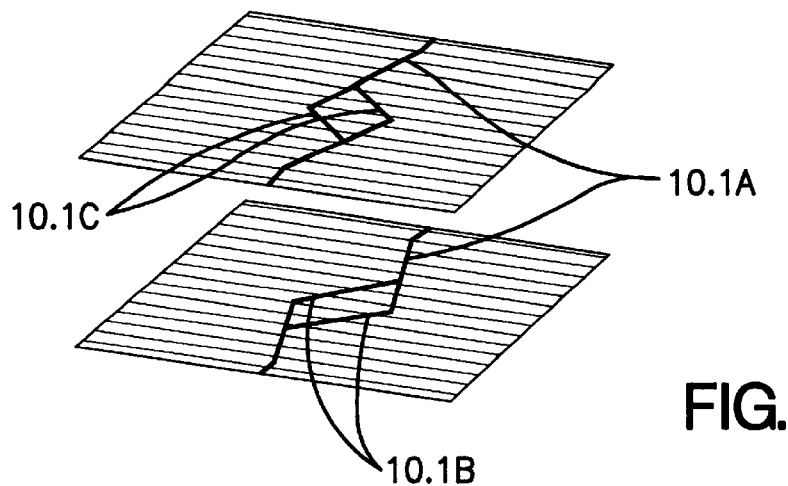
FIGS. 10A, 10B, and 10C show the production of a contact point by cutting out, folding and interfitting two layers.
Figures 10B, 10C:
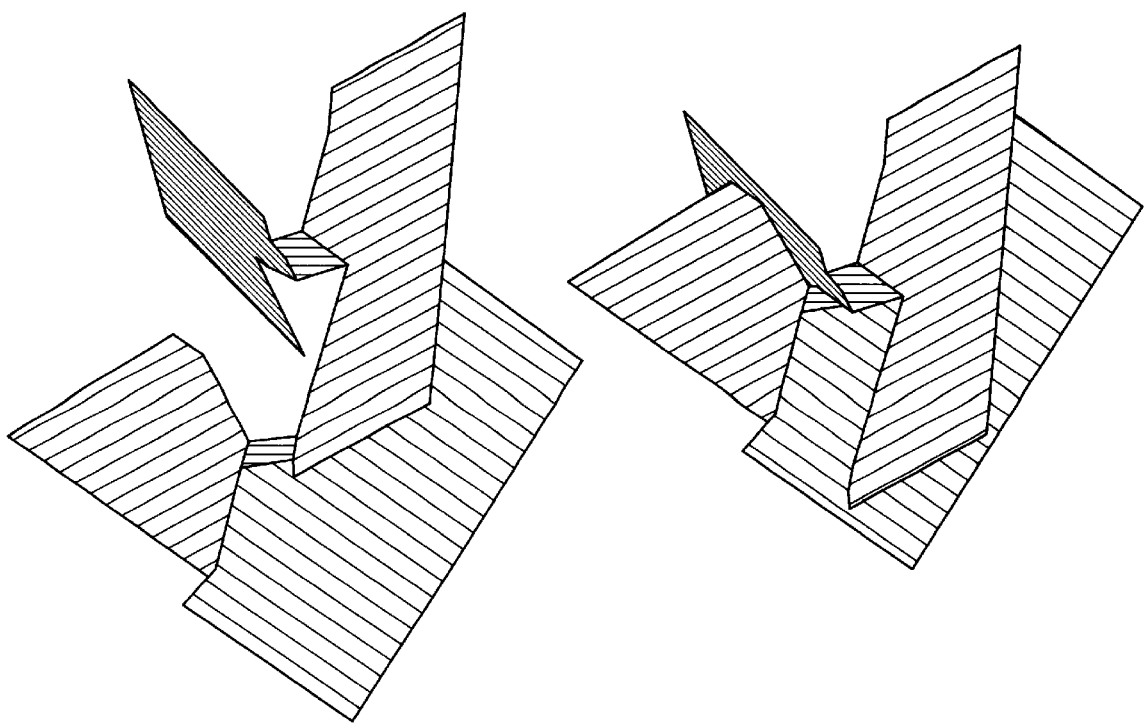

FIGS. 10A, 10B, and 10C show the possibility of interlocking the sheets at a contact point which can replace the local stamping at a point such as 6C, which is to say the center of a ventilator. For easier readability, the figures are projected such that the top to bottom direction extends toward the rear of the sheet. FIG. 10A shows only the detail of the cutout at the contact point. The cutout line is 10.1A. Then, the sheets are folded at 10.1C and at 10.1B. FIG. 10B shows the two folded sheets face to face before interlocking and FIG. 10C shows the interlocking. The interlocking forms the center of a ventilator and the four orientations of the deflectors can be seen in FIG. 10C upon holding upright the figure.

The interconnection can be designed so as to block the two degrees of freedom of translation at certain contact points or at all contact points. Or it can be designed to block one degree of freedom of translation at certain contact points and the other degree of freedom at other contact points.

Figure 11A:
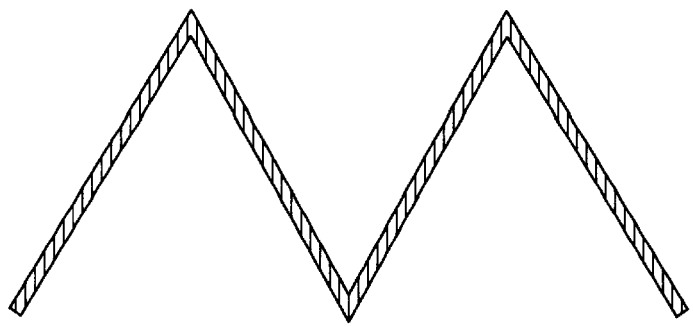
FIGS. 11A, 11B, 11C, and 11D show several folding programs permitting interfitting the layers with each other.
Figure 11B:
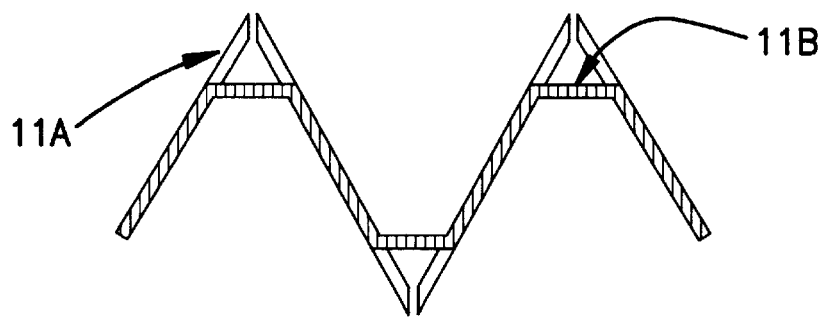
Figure 11C:
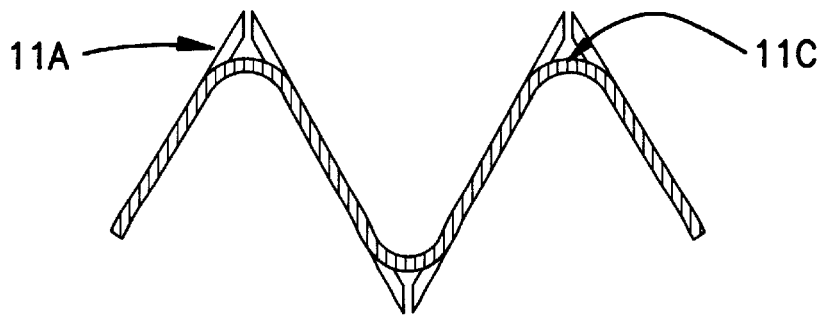
Figure 11D:
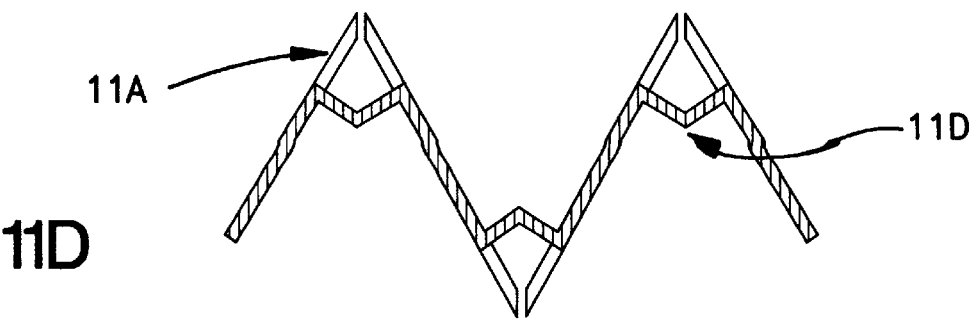

FIGS. 11A, 11B, 11C, and 11D show the sheets 11 according to the invention in which a contact surface is flat and delimited by two folds (FIG. 11B) or is curved (FIG. 11C) or uses more than two folds (FIG. 11D). In these three cases, the cutout permits the edges of the deflectors to form the projections (11A). FIG. 11A shows a single accordion fold. FIG. 11B shows the case in which the facet (11B)

comprising the interior of one pair of folds is flat, as is the case for FIGS. 10A, 10B, and 10C. In FIG. 11C, in place of folds, there is a curved surface (11C). Finally, in FIG. 11D, there is an extra fold (11D).

Figure 12:
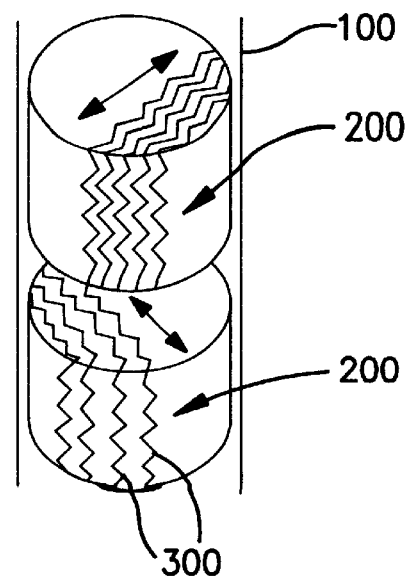
FIG. 12 shows a column casing with structured packings constituted by the device of the present invention.

FIG. 12 shows a casing 100 of a distillation column containing two blocks 200 of structured packing constituted by a heat and/or material exchange device according to the present invention.

The folded sheets 300 are assembled obliquely to the axis of the casing 100.

The heat and material exchange device of the present invention can be installed in any kind of column of an air separation apparatus, for example the medium pressure column, the low pressure column, the argon column, or the nitrogen removal column.

Each column can contain heat and material exchange devices according to the present invention as well as conventional structured packings (of the cross corrugation type for example) and/or bulk packing and/or plates.

The specific surface of the heat and material exchange device of the present invention can vary from one section of a column to another.

What is claimed is:

1. Heat and material exchange device comprising a stack of fixed ventilators to promote gas mixing, each ventilator being constituted by four deflectors whose mean normals are inclined and substantially generated one after another by rotation about vertical axes, the sum of the four angles of rotation being 360° and the ventilators being stacked in successive horizontal layers amidst which each deflector forms a part of two adjacent ventilators turned in opposite directions and such that there is sufficient space between two adjacent deflectors for the passage of gas, wherein the deflectors of the ventilators are neither rhombi of which a diagonal is horizontal nor triangles of which the base is horizontal or the angles of rotation of the deflectors are not 90° or the axes of rotation do not pass through the ends of the horizontal diagonals of the deflectors in the form of rhombi or the axes of rotation do not pass through the ends of the horizontal bases of deflectors of triangle shape or the upper summits of the rhombi or of the triangles of a layer do not coincide with a summit of a rhombus or a triangle of the immediately superjacent layer.

2. Device according to claim 1, in which the lower portion of at least some of the deflectors is bisymmetrical.

3. Device according to claim 1, in which the upper portion of at least some of the deflectors is symmetrical relative to a line of greatest slope, and of substantially inverted V shape, so as to promote spreading of the liquid.

4. Device according to claim 1, in which at least some of the deflectors are pierced by at least one hole so as to promote passage of the liquid to the underside of the deflectors.

5. Device according to claim 1, wherein at least some of the deflectors are connected to at least one of their neighbors in a same horizontal plane by a common edge segment so as to permit lateral division of the liquid between deflectors.

6. Device according to claim 1, in which at least some of the deflectors are connected to at least one of their neighbors by a common edge segment so as to secure the deflectors to each other.

7. Device according to claim 1, in which at least some of the deflectors penetrate a space located in vertical alignment with an adjacent deflector.

8. Device according to claim 1, in which at least some of the deflectors are designed to supply another deflector with liquid with the aid of a point or a liquid collector of another deflector.

9. Device according to claim 1, in which at least some of the pairs of adjacent deflectors have projections or notches permitting reciprocal interconnections so as to secure together the deflectors.

10. Device according to claim 1, in which the lower portion of at least some of the deflectors is at least in part enlarged so as to preserve for the liquid a streaming surface as large as possible.

11. Device according to claim 1, in which an end of at least two deflectors forms a projection.

12. Device according to claim 11, in which at least one said projection nests with another projection or with a notch so as to secure together the layers of ventilators.

* * * * *